United States Patent [19]
Fletcher et al.

[11] 3,956,932
[45] May 18, 1976

[54] WIND SENSOR

[76] Inventors: James C. Fletcher, Administrator of the National Aeronautics and Space Administration, with respect to an invention of James B. Stephens, La Crescenta; Eric G. Laue, San Marino, both of Calif.

[22] Filed: Jan. 29, 1975

[21] Appl. No.: 545,282

[52] U.S. Cl. ................................ 73/189; 73/204
[51] Int. Cl.² ...................................... G01F 1/68
[58] Field of Search ............... 73/189, 188, 194 E, 73/362 R, 204

[56] References Cited
UNITED STATES PATENTS

| | | | |
|---|---|---|---|
| 2,447,816 | 8/1948 | Rieber | 73/362 R X |
| 2,981,104 | 4/1961 | Auger et al. | 73/189 |
| 3,765,240 | 10/1973 | Haus, Jr. | 73/204 |

*Primary Examiner*—Jerry W. Myracle
*Attorney, Agent, or Firm*—Monte F. Mott; Paul F. McCaul; John R. Manning

[57] ABSTRACT

Apparatus for sensing the temperature, velocity, and direction of the wind, including four temperature-dependent crystal oscillators spaced about an axis, a heater centered on the axis, and a screen through which the wind blows to pass over the crystals. In one method of operation, the frequency of the oscillators is taken when the heater is not energized, to obtain the temperature of the wind, and the frequencies of the oscillators are taken after the heater is energized to determine the direction and velocity of the wind. When the heater is energized, the wind causes the downwind crystals to achieve a higher temperature than the upwind crystals, and with the magnitude of the difference indicating the velocity of the wind.

10 Claims, 8 Drawing Figures

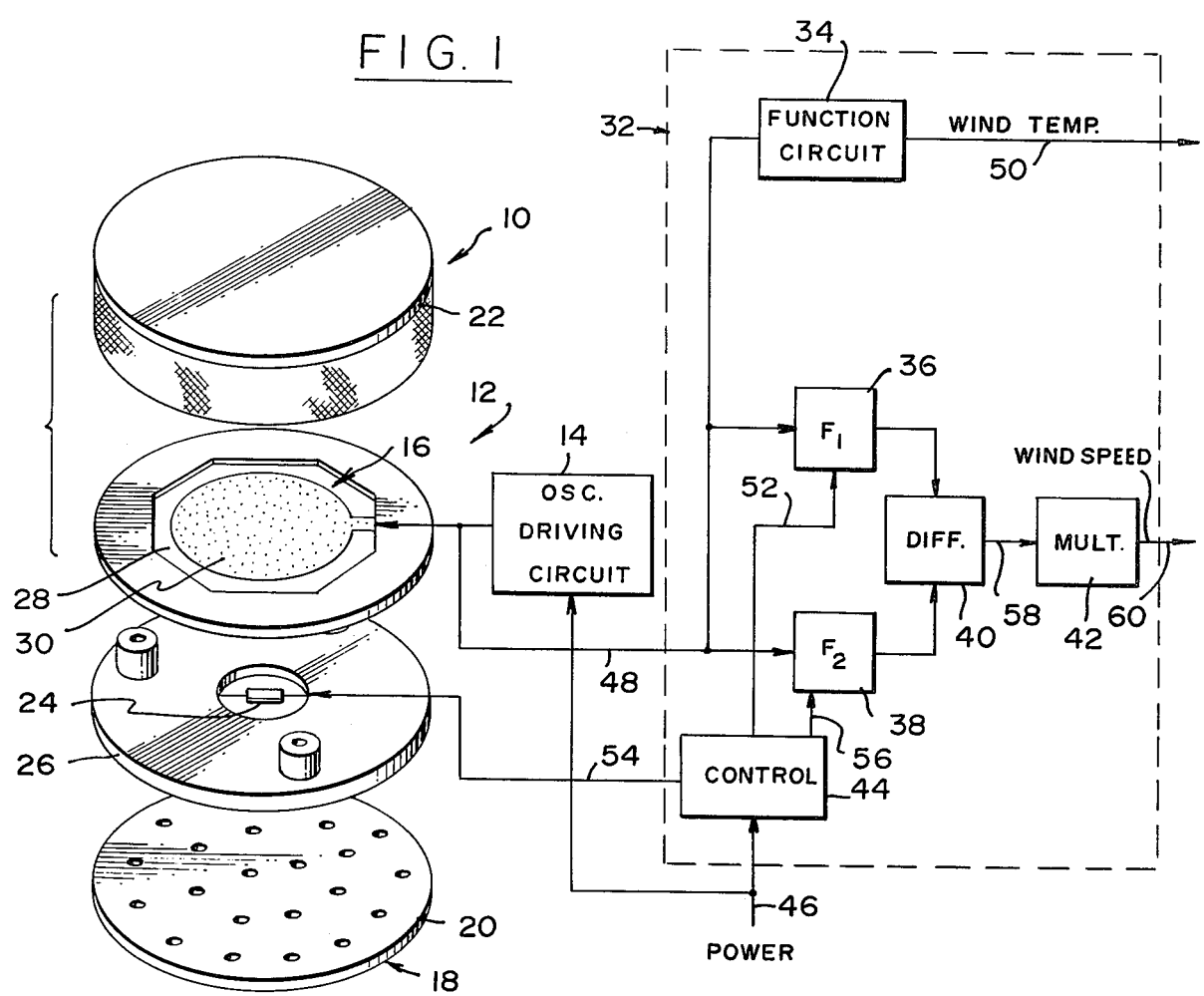
FIG. I
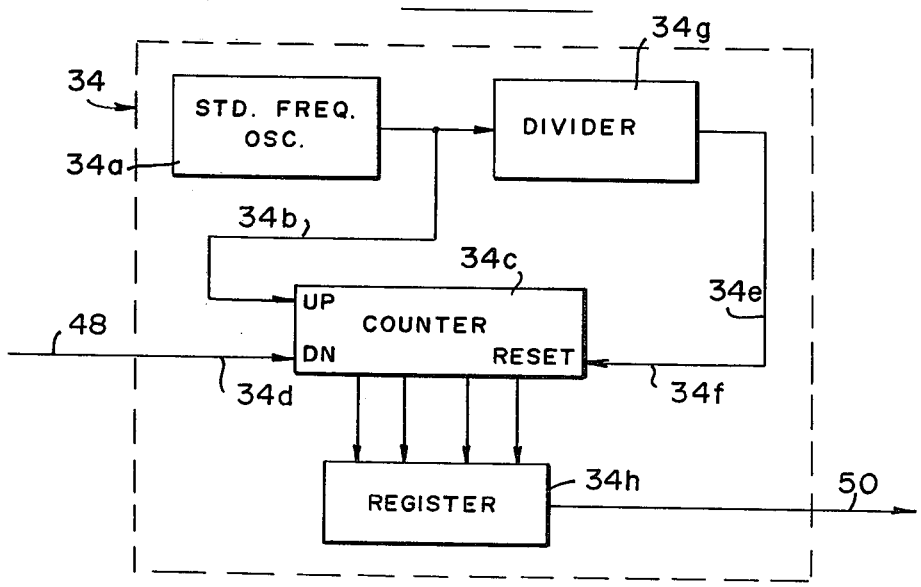
FIG. IA

3,956,932

WIND SENSOR

ORIGIN OF INVENTION

The invention described herein was made in the performance of work under a NASA contract and is subject to the provisions of Section 305 of the National Aeronautics and Space Act of 1958, Public Law 85–568 (72 Stat. 435; 42 U.S.C. 2457).

BACKGROUND OF THE INVENTION

This invention relates to sensor apparatus for measuring parameters of the wind.

Wind sensors that are rugged, that have a rapid response, and that provide outputs in the form of digital electrical signals are useful in a variety of situations. One application is in providing remote monitoring stations in a large forest or wilderness preserve to aid in safeguarding against fire damage. A relatively simple and rugged apparatus that could measure a variety of wind parameters and which could readily transmit the measurement information to a central station by radio relay would be highly useful.

SUMMARY OF THE INVENTION

In accordance with one embodiment of the present invention, a wind sensor with electrical output is provided that indicates the temperature, velocity, and direction of the wind. The sensor includes crystal-controlled oscillators whose frequencies vary with the temperature, and a heater which can heat the crystals. The temperature of the air, sometimes referred to as the temperature of the wind, is determined by noting the frequencies of the oscillators when the heater is not energized. When the heater is energized to heat the crystals, the upwind crystals are cooled by the wind while the downwind crystals are heated, in an amount dependent upon the velocity of the wind. The temperature of the crystals resulting from the effects of the heater and wind, and therefore the frequencies of the oscillators, indicate the velocity of the wind. Where directional information is required, at least three oscillators are provided with crystals spaced about a central axis, and with the heater centered on the axis, so that the wind blows heated air from the upwind crystals towards the downwind crystals to result in the downwind crystals experiencing a higher temperature. The difference in frequencies between the crystals is utilized to determine the direction of the wind. The temperature of the upwind crystal can be substantially unaffected by the heater, so that the frequency of the upwind crystal can represent the temperature of the wind.

The fact that at least two crystals are utilized to determine the wind direction enables the apparatus also to be used to determine the humidity. This is accomplished by coating at least one of the crystals with a moisture-absorbent layer. Before the heater is energized, the frequency of the moisture-sensitive crystal will be determined not only by the temperature of the wind but by the humidity. By comparing the temperature of the moisture-sensitive crystal with a crystal that is insensitive to moisture, the humidity can be determined. The moisture-sensitive crystal is utilized as one of the crystals which is heated to determine wind direction, with the frequency change due to moisture being subtracted from the frequency change due to the effects of the heater and wind.

The novel features that are considered characteristic of this invention are set forth with particularity in the appended claims. The invention will best be understood from the following description when read in connection with the accompanying drawings.

BRIEF DESCRIPTION OF THE DRAWINGS

FIG. 1 is an exploded perspective and block diagram view of a heater constructed in accordance with one embodiment of the invention, which is useful in measuring wind temperature and velocity;

FIGS. 1A and 1B are block diagrams showing portions of the circuit of FIG. 1 in greater detail;

DESCRIPTION OF THE PREFERRED EMBODIMENTS

Figure 1B:
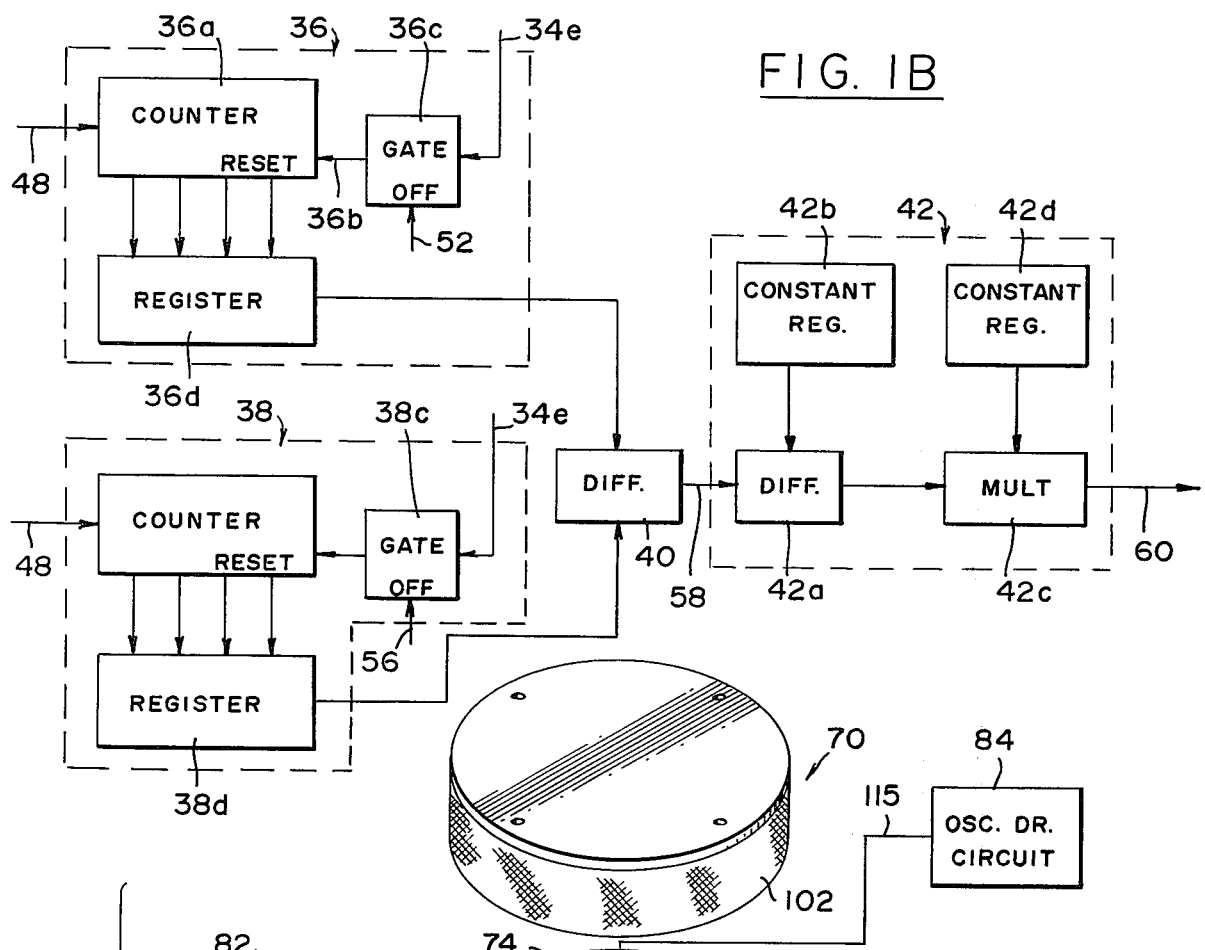

FIG. 1 illustrates a wind sensor 10 which includes a crystal oscillator 12 formed by an oscillator driving circuit 14 and a crystal device 16 which determines the frequency of the oscillator. The crystal device 16 is mounted on a housing 18 which includes a base 20 and a screen 22 that admits the wind while protecting the crystal device. A heater 24 is also provided, which is mounted on a plate 26 that is spaced from the crystal device 16. The crystal device 16 is constructed of a plate of quartz 28 and electrodes 30 on opposite faces of the quartz plate. The crystal device is temperature sensitive, so that the oscillation frequency of the oscillator 12 indicates the temperature of the crystal device. A control and sensing circuit 32 operates the apparatus to enable a measurement of the temperature of the wind (often referred to as the ambient temperature or the air temperature), as well as the speed of the wind.

The control and sensing circuit 32 energizes the oscillator 12 at a time when the heater 24 is not energized, to determine the oscillation frequency of the crystal device and therefore the temperature of the wind. The circuit 32 then energizes the heater 24 at a predetermined current level to cause it to deliver heat to the crystal device 16 and therefore to raise its temperature to a level above that of the wind. The wind blowing across the upper face of the crystal device then tends to cool it. For a given energization of the heater, the temperature increase of the crystal device is determined by the speed of the wind. Thus, by measuring the frequency of the oscillator 12 after the heater is energized, the circuit 32 enables a determination of the wind speed.

The circuit 32 includes a function circuit 34, a pair of memories 36, 38 that are connected to a differential circuit 40 and another multiplier 42, and a control circuit 44. Power is applied through a switch (not shown) to line 46 to the oscillator drive circuit 14 and to the control 44. Initially, the control 44 does not supply current to the heater 24. The frequency of the oscillator 12 is picked up through a line 48 and delivered to function circuit 34 which delivers a signal on line 50 which indicates the wind temperature.

FIG. 1A illustrates details of the function circuit 34, which includes a standard frequency oscillator 34a, formed by a crystal oscillator having a crystal whose frequency does not vary appreciably with temperature over the expected range of ambient temperatures (e.g. −20°C to 50°C). Such a crystal is obtained by cutting a "mother stone" of quartz along an optical plane which produces crystals that have a turnover point (the temperature at which the frequency-temperature coefficient changes from plus to minus, and therefore where the frequency-temperature coefficient is zero) in the middle of the expected temperature range, such as 50°F. The output of standard oscillator 34a is delivered to the up input 34b of an up-down counter 34c, whose down input 34d is connected to line 48 to receive oscillations of crystal 16. The counter is reset at uniform intervals by clock pulses received over line 34e at a reset input 34f, the clock pulses being derived by a divider 34g connected to the standard oscillator 34a. The counter is connected to a register 34h which receives a new count every time the counter 34c is reset. The output of register 34h is a digital representation of the frequency. For example, for a crystal 16 operating at 10 megacycles at a temperature of −20°C, and having a frequency-temperature coefficient of +500 Hz/°C, a standard oscillator 34a operating at 10 megacycles and having a substantially zero frequency-temperature coefficient over the operating range, and a divider 34f whose output is $10^{-7}$ times the input (i.e., one pulse per second output), a register count of 500 indicates a wind temperature of −19°C while a register count of 5000 indicates a wind temperature of −10°C. Of course, it is also possible to merely compare the frequency on line 48 to a calibration chart to enable an operator to read off the temperature, to thereby minimize the cost of the system.

Referring again to FIG. 1, oscillations delivered over line 48 are also delivered to the first memory 36. The control circuit 44 delivers a pulse over line 52 to the first memory 36 to cause it to register the oscillation frequency. After a period of time, the control circuit 44 delivers a predetermined current over line 54 to the heater 24 to cause it to heat the crystal device 16. While heat is being delivered to the crystal device, wind blowing through the screen 22 and across the face of the crystal device serves to cool it. The resulting temperature and therefore frequency of the crystal device is determined by the speed of the wind. After sufficient time to stabilize conditions, the control circuit 44 delivers a pulse over line 56 to the second memory 38 to cause it to record the new frequency of the oscillator as sensed over line 48. The two frequencies in the two memories 36, 38 are then compared in a difference circuit 40 which delivers a signal over line 58 to the second function generator 42. The second function generator 42 delivers a signal over line 60 which indicates the speed of the wind. The wind speed determines the frequency of the crystal device at the second time when the heater is energized, and the difference frequency delivered over line 58 is processed by the second function generator 42 which is constructed to convert the temperature difference into a wind speed indication. Over limited temperature and wind velocity ranges, the wind speed is proportional to the difference between a predetermined frequency found to exist on line 60 at zero wind speed and the actual frequency on line 60.

FIG. 1B illustrates details of the memories 36 and 38. Memory 36 includes a counter 36a which counts cycles received over line 48 from the crystal 16. The counter has a reset input 36b which receives clock pulses delivered through a latching gate 36c from line 34e (which is connected to the divider 34g of FIG. 1A). When a clock pulse is received at reset input 36b, the count in the counter is delivered to a register 36d and the counter is reset to zero. When a pulse is received over line 52, the gate 36c is latched off, so that the counter cannot deliver a new count to register 36d, and therefore the register 36d retains the count which existed before the heater is energized. The memory 38 is similar to 36, except that memory 38 has a gate 38c which is latched off by a pulse over line 56 which is delivered after the heater is energized, so that register 38d retains a count indicating the frequency of the crystal when it is heated. The difference circuit 40 is a digital circuit whose output number is the difference between the two inputs. In one simplified example, where the crystal 16 has a frequency-temperature coefficient of 500 Hz/°C and where the initial temperature is 20°C, the temperature rise is 1°C at zero wind speed. The function circuit 42 includes a difference circuit 42a which subtracts a constant of 500 held in a register 42b, from the input over line 58, and the function circuit also includes a multiplier 42c that multiplies a constant of 0.1 held in register 42d, by the output of the difference circuit 42a. At zero wind speed, the output of difference circuit 40 is 500 (indicating a temperature rise of 1.0°C), the output of difference circuit 42a is zero, and the output of multiplier 42c is zero. At a wind speed of one kilometer per hour (kph), the output of difference circuit 40 is 490 (indicating a temperature rise of only 0.98°c), the output of difference circuit 42a is 10, and the output of multiplier 42c is one, indicating a one kph wind speed. At a wind speed of ten kph, the output of circuit 40 is 400 (indicating a rise of only 0.90°C), and the output of multiplier 42c is ten, indicating a ten kph wind speed. Of course, a determination of wind speed can be made by an operator who compares the two frequency readings on line 58 to a calibration graph to read off the wind velocity. Different graphs may be utilized over different ambient temperature ranges and wind speed ranges.

Figure 2:
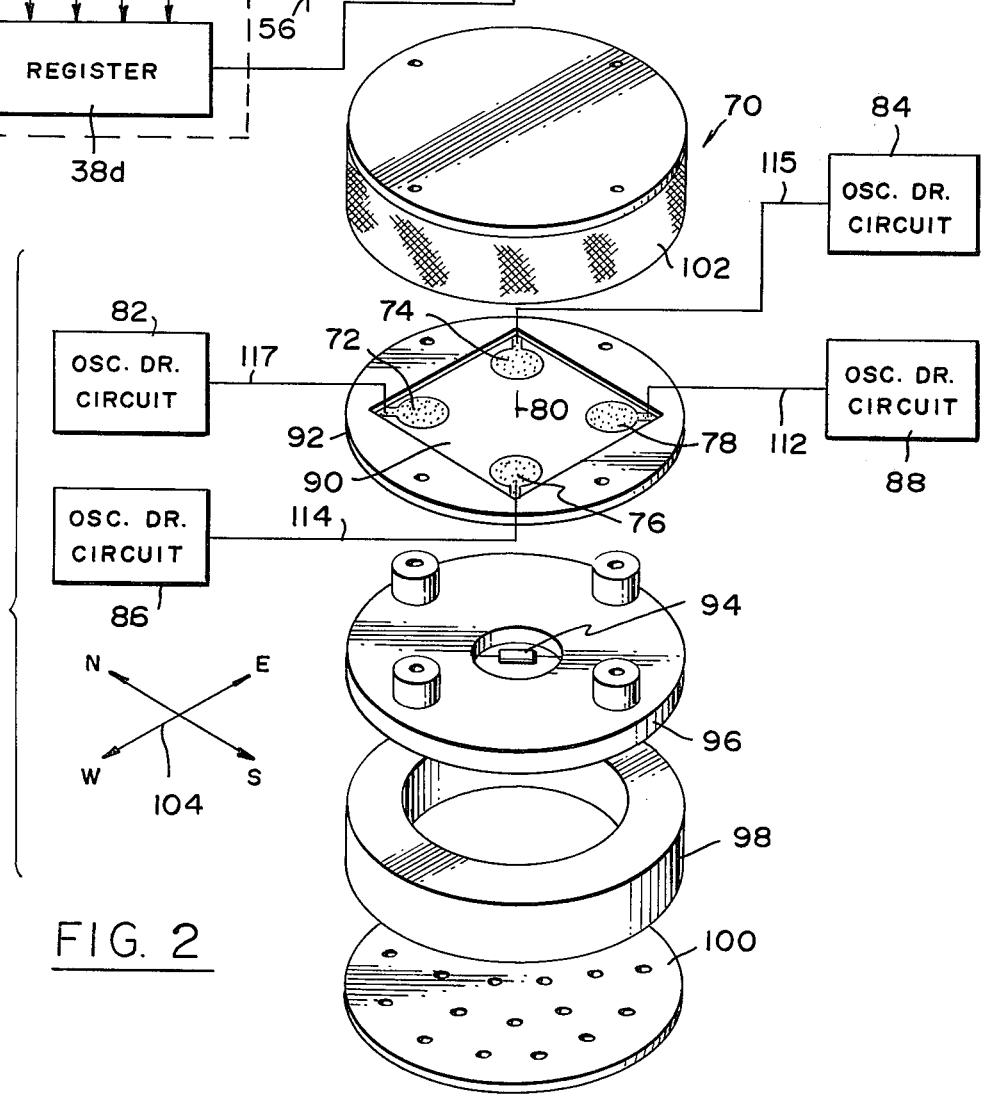
FIG. 2 is an exploded perspective view of a wind sensor constructed in accordance with a second embodiment of the invention, which utilizes four crystal oscillators to also provide an indication of the wind direction.
Figure 3:
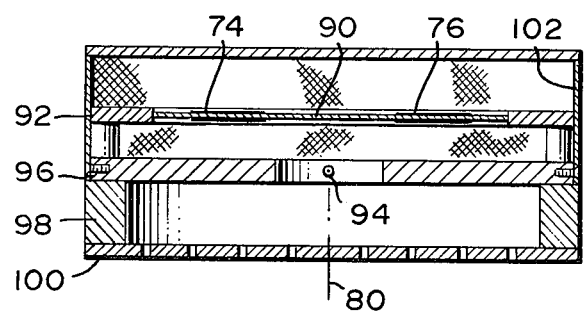
FIG. 3 is a sectional view of the sensor of FIG. 2.
Figure 4A:
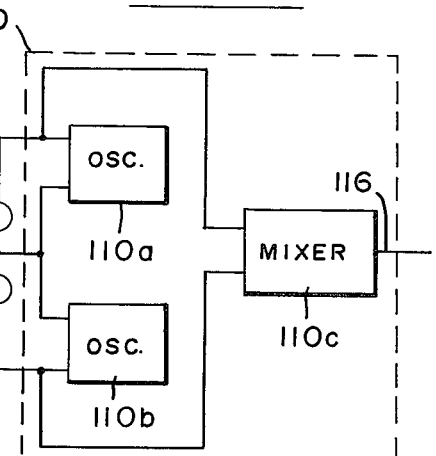
FIG. 4A is a block diagram of one of the circuits of FIG. 4.
Figure 4:
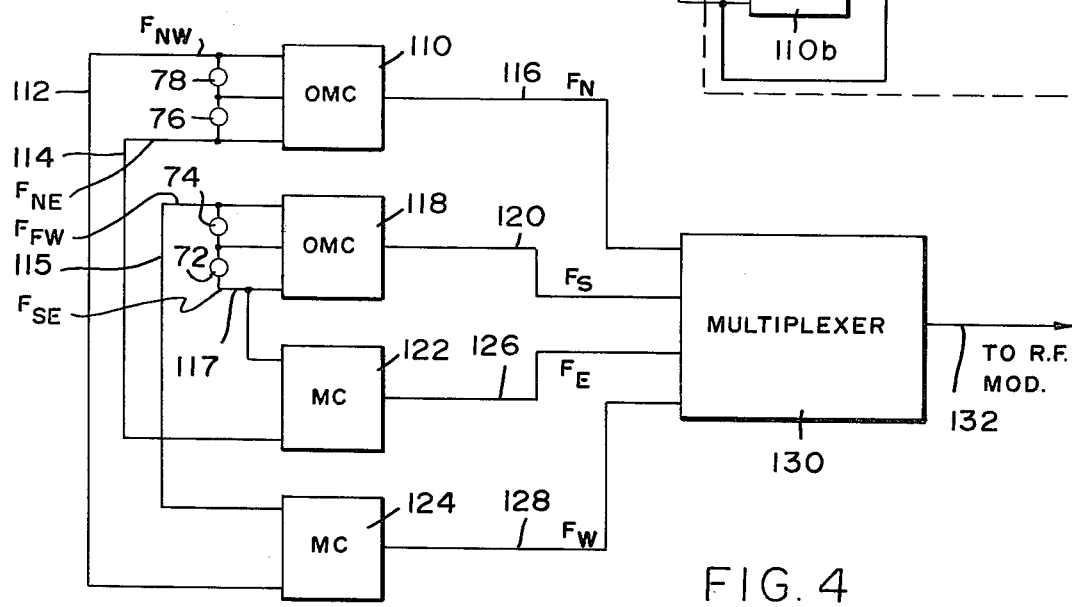
FIG. 4 is a block diagram view of circuitry utilized with the sensor of FIG. 2.

FIGS. 2–4 illustrate a wind sensor 70 which not only provides an indication of the wind temperature and speed, but which also can provide an indication of the direction of the wind. The wind sensor includes four crystal devices 72, 74, 76, 78 which are spaced about a central axis 80. Each of the crystal devices is connected to a corresponding oscillator driving circuit 82, 84, 86, 88. The crystal devices are formed by pairs of electrodes on opposite sides of selected regions of a homogenous plate 90 of quartz. The quartz plate 90 has an appreciable temperature-frequency coefficient (typically between 400° and 1000 Hz/°C) so that the frequency of each crystal device changes appreciably with its temperature, but the coefficients are the same for all four crystal devices. The quartz plate 90 is mounted on a holding plate 92 that is part of a housing of the sensor. A heater element 94 is mounted on another plate 96 of the housing, with the heater element 94 centered on the axis 80 about which the crystal devices are arranged, so that in the absence of wind all four crystal devices receive the same amount of heat. The housing also includes a base plate 98 which surrounds the electrical circuitry, a bottom cap 100, and a screen 102 that covers the group of crystal devices while allowing wind to blow from any direction across them, and to attenuate the wind speed so that over the range of speeds to be measured the attenuated speed is of the same order of magnitude as the convection generated thermal plume rising from heater element 94.

The four crystal devices 72–78 can be utilized to measure the direction of the wind, as well as the temperature and velocity. When the heating element 94 is energized, all four crystal devices 72–78 are heated to a temperature above the wind temperature (which is often referred to as the air temperature), and in the absence of wind all crystal devices will achieve the same temperature. However, when a wind blows across the crystal devices, those crystal devices which are upwind from the others are most effectively cooled, because only unheated wind blows across them. Those crystal devices which are downwind from the others are not cooled as effectively, because the wind blowing across them is partially heated. Thus, for example, with the wind sensor oriented as shown in relation to the compass directions indicated at 104, a northwest wind will result in crystal device 72 being at the lowest temperature, crystal device 78 being at the highest temperature, and crystal devices 74 and 76 being at the same temperature which is intermediate the extremes.

Within a range of temperatures and wind velocities, the frequency change of each crystal is proportional to the velocity of that component of the wind which is directed at that crystal. For example, within a range of wind velocities and temperatures, the frequency change of crystal 78 is proportional to the velocity of the northwest component of the wind. FIG. 4 illustrates a circuit which provides signals indicating the temperature, velocity, and direction of the wind within a limited range of wind temperatures and velocities. The circuit includes a first dual oscillator mixing circuit 110 which receives signals on lines 112 and 114 that indicate the frequencies of the two crystals 78, 76 that are downwind from the northwest and northeast directions respectively. The difference in their frequency, delivered on line 116, is a frequency proportional to the velocity of the northern component of the wind. In a similar manner, a dual oscillator mixing circuit 118 provides a signal on line 120 which is a frequency proportional to the velocity of the southern component of the wind. Two other mixing circuits 122, 124 provide signals on lines 126, 128 whose frequencies are proportional to the easterly and westerly wind components, respectively. These four signals 116, 120, 126, and 128 are delivered to a four channel multiplexer 130 whose output is delivered over line 132 to a radio frequency modulator for transmission of the signal values to a central receiving station. Each of the dual oscillator mixing circuits 110, 118 have the construction shown in FIG. 4A, with a pair of oscillator driving circuits 110a, 110b and a mixer 110c, while each mixer 122, 124 comprises a mixer.

In many cases, it is useful to know the velocity of each of the four wind components. Where it is only necessary to determine the net direction and velocity of the wind, only two of the signals such as those on lines 116 and 126 or those on lines 120 and 128 are required. The wind direction and velocity can be easily determined by graphically adding two wind vectors or by utilizing a computer circuit to calculate this. The air or wind temperature can be indicated by the wind sensor 70, by noting the frequency of any of the four crystal devices prior to energizing the heater 94. Alternatively, the air or wind temperature can be determined by merely noting the frequency of the upwind crystal or pair of crystals. The later method is accurate, especially where the heating element raises the temperatures of the crystals only a fraction of one degree centigrade when there is no wind, this small amount of heating being possible because of the large temperature-frequency coefficient of the crystals.

It is often desirable to determine at each remote sensing station, not only the wind temperature, velocity, and direction, but also the humidity of the wind. This can be easily accomplished by utilizing a variety of humidity sensors, including a dual crystal oscillator device of the type described in U.S. Pat. application Ser. No. 205,803, filed Dec. 8, 1971. That patent application describes a sensor such as one for measuring humidity, which includes a pair of crystal devices with one having a moisture-absorbent coating and the other devoid of such a coating, and with both exposed to the atmosphere so that the frequency difference of the crystal devices is due to the moisture absorption of one of the crystals. This type of humidity sensing apparatus can be incorporated in the wind sensor 70 without requiring additional crystal devices and corresponding drive oscillator circuits, by utilizing one of the crystal devices such as 78 to sense humidity. This is accomplished by applying a layer of moisture-absorbent material to the upper surface of the crystal device 78, as by applying a layer of controlled thickness of aluminum oxide to the upper electrode of crystal device 78 so that the aluminum oxide is exposed to the wind. Since all of the four crystal devices are on the same homogenous slab of crystal, they have the same temperature coefficient. A determination of humidity is obtained by merely comparing the frequency of the moisture-sensitive crystal device with the frequency of any other of one of the crystal devices, before the heater 94 is energized. Thus, the signal on line 116 which represents the difference between the frequencies of crystal devices 78 and 76, would indicate the humidity, if the signal on line 116 is taken before the heater 94 is energized. When the heater 94 is later energized to enable a determination of the wind direction and velocity, the portion of the frequency difference on lines 116 and 128 due to humidity is taken into account to enable a true determination of wind velocity and direction.

Figure 5:
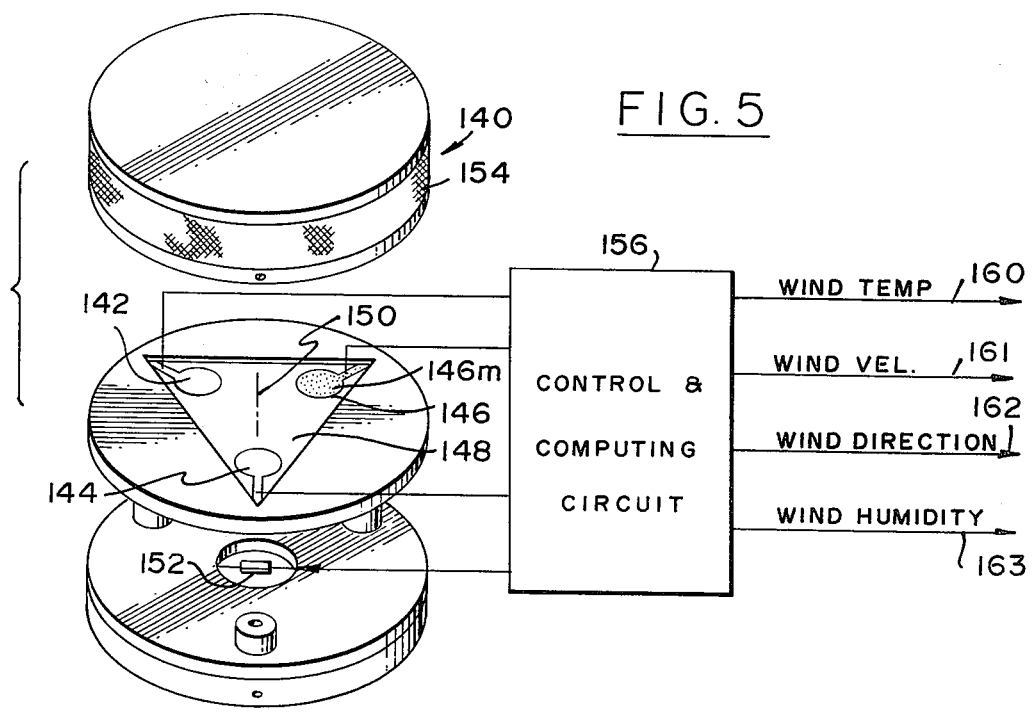
FIG. 5 is an exploded perspective and block diagram view of a wind sensor constructed in accordance with a third embodiment of the invention, which utilizes only three crystal oscillators and which also provides an indication of humidity.

FIG. 5 illustrates a wind sensor 140 which utilizes a minimal number of crystal devices to measure the wind temperature, velocity, direction, and humidity. The sensor 140 includes three crystal devices 142, 144, and 146 which are mounted on a homogenous plate 148 of crystal material such as quartz, and with the three crystal devices being uniformly spaced about a central axis 150. One of the crystal devices 146 includes a layer 146m of moisture-absorbent material such as aluminum oxide on top of an electrode, while the other two crystal devices 142, 144 are devoid of such a layer on their upper electrodes. A heating element 152 is mounted below the group of crystal devices, while a screen 154 allows wind to blow from any direction across the crystal devices. The operation of the apparatus is controlled and sensed by a control and computing circuit 156 which includes oscillator driving circuits for driving each of the three crystal devices, circuitry for energizing the heating element 152, and computing circuitry for providing signals on lines 160–163 that indicate four parameters of the wind based upon the frequencies of the crystal devices before the heater 152 is activated and at a time after the heater is activated.

Thus, the invention provides an apparatus which is useful in measuring a variety of wind parameters. The apparatus utilizes crystal devices that control the frequency of oscillator circuits to provide high sensitivity in a relatively small and rugged device that generates an electrical output that is ready for processing. A crystal device is utilized to measure wind velocity by measuring the change in frequency and therefore the change in temperature resulting when a heater adjacent to the crystal device is energized at a known level while the wind is allowed to pass through the sensor to change the temperature of the crystal device. The wind can be allowed to pass only across one face of the crystal device so that air currents cool the crystal. It is also possible to allow the wind to blow through a space between the heater and crystal device so that the wind deflects the plume of hot air rising from the heater and affects the temperature in this way. A group of at least three crystal devices can be utilized to measure the direction and velocity of the wind by noting the differential heating of the crystal devices. Where a group of at least three crystal devices is utilized to measure the direction of the wind, it is possible to construct the apparatus to also measure the humidity without requiring the addition of another crystal device, by making one of the crystal devices moisture absorbent.

Although particular embodiments of the invention have been described and illustrated herein, it is recognized that modifications and equivalents may readily occur to those skilled in the art and consequently, it is intended that the claims be interpreted to cover such modifications and equivalents.

The embodiments of the invention in which an exclusive property or privilege is claimed are defined as follows:

1. A wind sensor comprising:
   a housing;
   an energizable oscillator mounted on said housing, including an oscillator driving circuit and a crystal device which controls the oscillation frequency, said crystal device having an appreciable temperature coefficient so that the oscillation frequency varies appreciably with the temperature of the crystal device;
   a controllably energizable heater disposed near said crystal device to heat it;
   said housing having an opening through which wind can pass to change the temperature of said crystal device; and
   control means for energizing said crystal oscillator while maintaining said heater substantially unenergized at a first time, so that the oscillation frequency is dependent upon the wind temperature, and for energizing both said crystal oscillator and said heater at a second time, so that the oscillation frequency is dependent upon the wind speed as well as the wind temperature, whereby to permit a determination of the wind speed as well as the wind temperature.

2. The wind sensor described in claim 1 including:
   a plurality of additional crystal oscillators mounted on said housing, each oscillator including a crystal device so that at least three crystal devices are on said housing;
   said heater being positioned to heat all of said crystal devices, and said opening being positioned to admit wind from substantially all compass directions to pass through the housing along paths that cool said crystal devices and move heat from one crystal device to another.

3. The wind sensor described in claim 2 including:
   means coupled to said oscillators for comparing their frequencies at a time after the heater has been energized and generating a signal indicating the direction of the wind.

4. A wind sensor comprising:
   a housing;
   at least three electrically energizable crystal oscillators mounted on said housing, each including a temperature-sensitive crystal device for determining the frequency of oscillation of the oscillator;
   electrically energizable heater means mounted on said housing for heating all of said crystal devices;
   said housing having an opening for admitting wind from substantially all directions of the compass to blow across said crystal devices; and
   means for supplying energizing currents to said three crystal oscillators and to said heater, to thereby permit the determination of wind direction and velocity by noting the pattern of frequencies resulting from heating;
   a first one of said crystal devices including a layer of moisture-absorbent material at a surface thereof which is exposed to the atmosphere, and a second of said crystal devices having a surface portion of lesser moisture absorbancy than said layer of said first crystal device, whereby to utilize the plurality of crystal devices to also provide a moisture indication within a range of temperatures.

5. A wind sensor comprising:
   a housing;
   a substantially homogenous slab of crystal material;
   at least three electrically energizable crystal oscillators mounted on said housing, each including a temperature-sensitive crystal device for determining the frequency of oscillation of the oscillator, each crystal device having a portion formed by a different region of said slab of crystal material and by a pair of electrodes on opposite faces of the corresponding region of the slab;
   electrically energizable heater means mounted on said housing for heating all of said crystal devices;
   said housing having an opening for admitting wind from substantially all directions of the compass to blow across said crystal devices; and
   means for supplying energizing currents to said three crystal oscillators and to said heater, to permit the determination of wind direction and velocity by noting the pattern of frequencies resulting from heating.

6. A wind sensor comprising:
   a housing;
   at least three electrically energizable crystal oscillators mounted on said housing, each including a temperature-sensitive crystal device for determining the frequency of oscillation of the oscillator;
   electrically energizable heater means mounted on said housing for heating all of said crystal devices;
   said housing having an opening for admitting wind from substantially all directions of the compass to blow across said crystal devices; and means for supplying energizing currents to said three crystal oscillators and to said heater, to thereby permit the determination of wind direction and velocity by noting the pattern of frequencies resulting from heating;

said crystal devices being spaced about a central axis; and said means for supplying energizing currents including computer means for indicating the wind direction, said computer means generating an indication that the wind is from a direction which is close to the direction, from said axis, of the crystal device having a frequency indicating it is at a lower temperature than the other crystal devices.

7. A wind sensor comprising:

a housing;

at least three electrically energizable crystal oscillators mounted on said housing, each including a temperature-sensitive crystal device for determining the frequency of oscillation of the oscillator;

electrically energizable heater means mounted on said housing for heating all of said crystal devices;

said housing having an opening for admitting wind from substantially all directions of the compass to blow across said crystal devices; and means for supplying energizing currents to said three crystal oscillators and to said heater, whereby to permit the determination of wind direction and velocity by noting the pattern of frequencies resulting from heating;

said means for supplying energizing currents includes control means for energizing said oscillators but not said heater at a first time, and for energizing said oscillators and heater at a second time.

8. A method for generating an indication of the temperature and velocity of the wind comprising:

exposing the surface of a crystal device of a crystal oscillator to the wind;

measuring the frequency of the oscillator at a first time;

applying a predetermined current to a heating element that is positioned close to said crystal device, at a second time;

measuring the frequency of the oscillator at said second time; and generating a wind velocity indication of a magnitude which is a function of the frequency change of said oscillator between said first and second times.

9. The method described in claim 8 wherein:

at least a first of said crystal devices is moisture absorbent and at least a second of said crystal devices is resistant to moisture absorption and including energizing said oscillators but not said heating means, at a first time; and generating a moisture indication which is a function of the frequencies of said first and second frequency control devices at said first time.

10. A method for generating an indication of the direction of the wind comprising:

positioning at least three temperature-dependent frequency control devices of three oscillators, about a substantially vertical central axis;

exposing the surfaces of said frequency control devices to the wind;

applying current to heating means that heats all of said frequency control devices; and generating a wind direction indication dependent upon the the difference in frequency of said frequency control devices.

* * * * *